Oct. 23, 1934.  E. O. LOEBER  1,977,641
RECEPTACLE
Original Filed Oct. 16, 1931
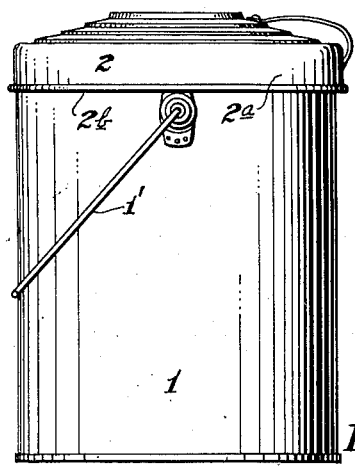
Fig.1
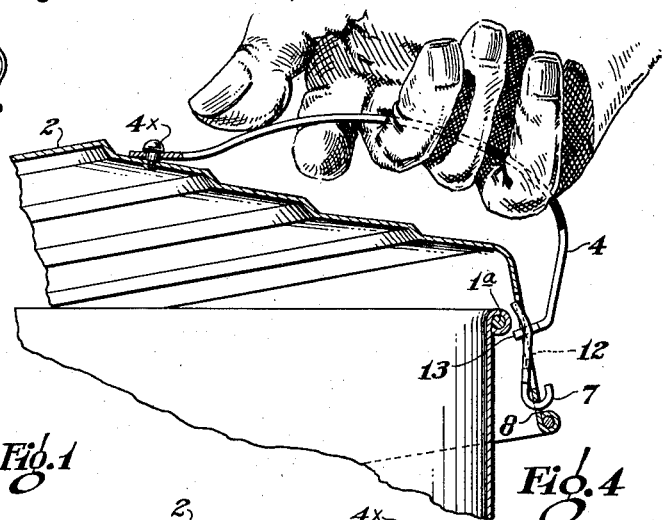
Fig.4
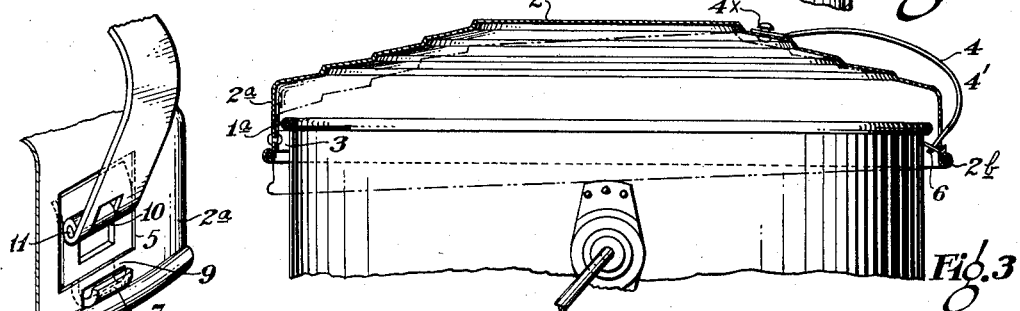
Fig.3
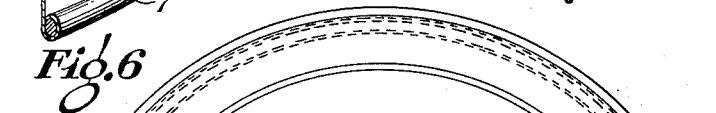
Fig.6
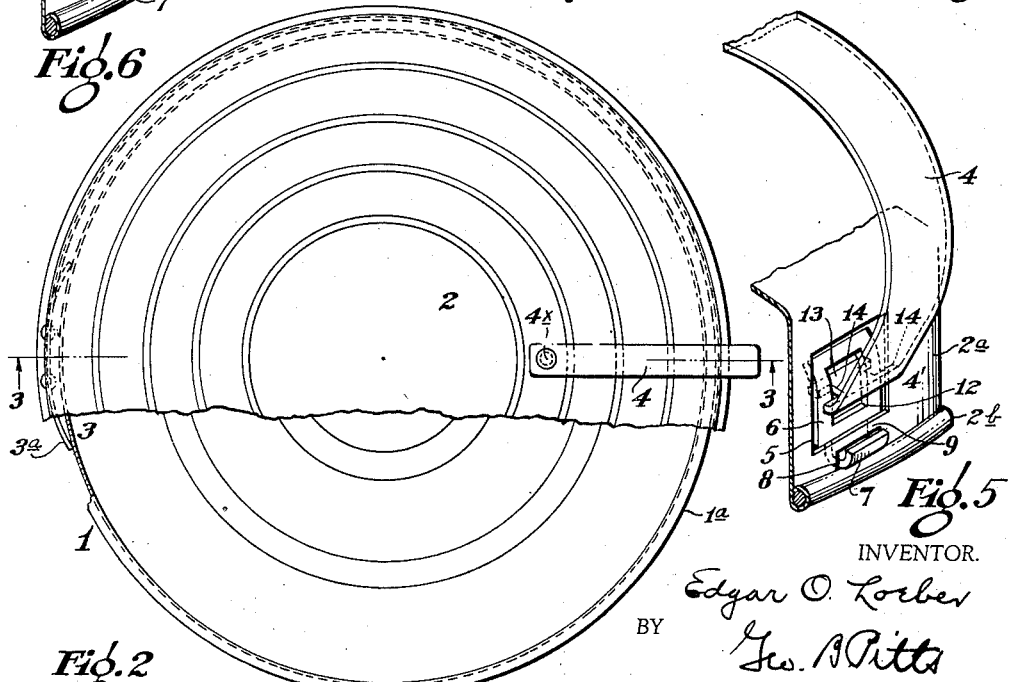
Fig.2
Fig.5
INVENTOR.
Edgar O. Loeber
BY
Geo. B Pitts
ATTORNEY.

Patented Oct. 23, 1934

1,977,641

UNITED STATES PATENT OFFICE 1,977,641

RECEPTACLE

Edgar O. Loeber, Cleveland, Ohio, assignor, by mesne assignments, to The Stay-On Mfg. Company, Cleveland, Ohio, a corporation of Ohio Application October 16, 1931, Serial No. 569,155
Renewed February 8, 1933

9 Claims. (Cl. 220—56)

This invention relates to receptacles having a removable, self locking cover, the present embodiment of the invention being particularly adapted for use in connection with what are commonly known as "garbage cans" where it is desirable to prevent tilting, lifting, or removal of the cover either by the force of the wind or by animals.

One object of the invention is to construct a receptacle and a removable cover or lid therefor provided with locking means having a gravity controlling member normally operable to make the locking means effective, but which when raised moves the locking element or latch into an inoperative position, to permit ready removal of the cover.

Another object of the invention is to construct a receptacle and a cover or lid therefor having between them self locking elements of relatively simple construction.

Other objects of the invention will be apparent to those skilled in the art to which my invention relates from the following description taken in connection with the accompanying drawing, wherein Fig. 1 is a side elevation of a receptacle embodying my invention.

Fig. 2 is a plan view, with parts broken away.

Fig. 3 is a fragmentary section on the line 3—3 of Fig. 2, showing the position of the cover when attempt is made to elevate it.

Fig. 4 is a fragmentary section similar to Fig. 2 (enlarged) showing the operation of removing the lid or cover.

Fig. 5 is a fragmentary perspective view of the lid with the locking means partially elevated.

Fig. 6 is a fragmentary view showing a different embodiment of the invention.

The receptacle 1, may be of any suitable and convenient form, said receptacle, in the present instance, comprising the usual cylindrical receptacle or container body and provided around its upper marginal edges with an outwardly extending projection 1a, said projection, in the present instance, comprising the usual outwardly extending beaded rim. 1' indicates a bail or handle.

The lid or cover 2 may likewise be of any suitable and convenient form, being provided with a depending rim 2a, adapted to fit over the top of the receptacle or container and preferably provided around its lower or terminating edge with a beaded portion 2b.

As a means of initially mounting and securing one side of the cover 2, to the upper marginal edges of the receptacle 1, one side of the rim 2a, is provided internally with a device 3 disposed in opposed relation to the side wall or body of the receptacle 1 and arranged to engage the bead 1a when attempt is made to raise the cover 2 (see Fig. 3), except when a handle 4, forming one element of a locking and releasing means 4', to be later referred to, is first raised, as shown in Figs. 4 and 5. The device 3 preferably comprises a resilient, flat metal strip, the free end portion of which normally flexes inwardly, so that when the cover 2 is positioned it tends to move or slide the cover laterally on the bead 1a to more effectively insure engagement of the locking and releasing means with the bead 1a, as later set forth. In the form of construction shown in Figs. 1, 2 and 3, the device 3 comprises a horizontally disposed resilient metal strip 3a having its intermediate portion suitably riveted to the inner wall of the rim 2a, its end portions being free and normally engaging the side wall or body of the receptacle 1, when the cover is on the receptacle 1, as most clearly shown in Figs. 1 and 2.

The locking means 4' comprises a linkage one end of which is pivoted to the exterior of the cover and the other end of which extends through an opening 5 in the cover rim 2a. The linkage preferably comprises two pivotally connected members, one constituting the handle 4 already referred to and the other constituting a locking and releasing latch 6, pivotally connected at its lower end on a portion of the rim. By preference, the lower end of the latch 6 has a tongue 7 which is curled to form a knuckle and the wall of the rim 2a below the opening 5 is formed with a slot 8, thereby providing a wall 9 which forms the pivot device on which the knuckle 7 rotates to permit the latch 6 to swing inwardly and outwardly, as later set forth.

The handle 4 and latch 6 are pivotally connected intermediate the upper and lower ends of the latter, in which arrangement the upper end of the latch operates to engage and disengage the projection 1a. The upper end of the latch is preferably curved inwardly to position its free edge in a more effective relation to the projection 1a and also to extend beyond any projection resulting from the form of hinge connection utilized to connect the two members together, as is apparent from the exemplified form shown in Fig. 5. This arrangement permits that portion of the latch 6 above its hinge connection to be used as a stop in the exemplified form shown in Fig. 6, since such portion will engage the inner face of the handle 4 when the latter is raised to limit the articulation of the handle and latch outwardly.

The upper end of the handle 4 is movably connected to the top surface of the cover 2, preferably by a pivot connection 4x. The pivot connected may be a stepped rivet extending loosely through an opening in the handle and permitting the latter to freely swing upwardly and downwardly, whereby the outer portion of the handle may gravitate downwardly to operate the latch 6.

The connection between the two members 4, 6, shown in Fig. 6 may consist of alined knuckles 10 connected by a hinge pin 11.

The connection between the two members 4, 6, shown in Figs. 1, 3, 4 and 5 may be of the pivotal, slidable type. In this form of construction, the latch 6 is formed with an opening 12 and the lower end portion of the handle 4 is bent laterally to form a flange 13. The flange 13 is formed on its opposite sides with recesses 14 to receive the side walls of the opening 12, these side walls and the walls of the recesses 14 co-operating to pivotally and slidably connect the handle 4 and latch 6 together. The handle 4 and latch 6 are connected by disposing one at an angle to the other and slipping the lower free end of the handle diagonally through the opening 12.

The handle 4 and latch 6 may be formed from flat strip metal.

When the handle 4 is in its normal or gravitated position, as shown in Figs. 1, 2 and 3, the lip or latch 6 is operatively related to the bead 1a, being below and within its periphery, preferably resting against the receptacle 1, so as to inter-engage with the bead when attempt is made to tilt, elevate or raise the cover 2, as shown in dotted and full lines in Fig. 3. However, when the handle is grasped, in the operation of removing the cover, it is first raised relative to the cover, the effect of which is to swing it upwardly about the pivot connection 4x, as shown in Fig. 5, such movement being permitted by the pivotal connection 4x between the handle and cover. In such operation, the lower end of the handle 4 swings upwardly into engagement with the upper wall of the opening 12, and as such end traverses the opening 12 it swings the latch 6 outwardly beyond the projection 1a, so that in the continued raising movement through the handle the latch 6 clears the projecting 1a, as shown in Fig. 4, and permits the cover to be removed. After the latch 6 passes the bead or projection 1a, the device 3 on the cover may be readily disengaged from the bead 1a. When the handle is operated as above described, the outer end of the handle 4 being engaged with the upper wall of the opening 12, it is connected through the latch 6 to the rim 2a, so that the cover may be readily raised supported and replaced. Upon replacement of the cover 2 and release of the handle 4, the outer portion of the latter gravitates downwardly and automatically positions the latch 6 in operative relation to the bead 1a, as shown in Fig. 3.

The opening 5 is preferably larger than the latch 6, so that when the handle 4 is raised to release the latch, the latter may swing into the plane of the wall of the rim 2a (see Fig. 4) and thus insure clearance of the projection 1a, especially where the rim 2a makes a relatively close fit thereon.

From the foregoing description it will be noted that I provide a freely movable handle which is operated upwardly to release the cover and when released it gravitates and causes the latch to swing into operative relation to the adjacent portion of the bead 1a, so that the cover becomes automatically locked to the receptacle. It will also be noted that my construction is relatively simple in that it comprises few parts, is easily made and is readily operated; also that the parts are connected and related to insure long life and withstand hard use.

By preference, the device 3 and handle 4 are disposed in diametrical relation and are co-operative to lock the cover 2 on the receptacle 1, especially when the cover is moved in a direction substantially axially of the receptacle or when the upward pressure on the cover is applied at one edge thereof intermediate the device 3 and handle 4.

By making the device 3 of resilient metal, it tends to slide the cover on the bead 1a to maintain that side of the rim 2a carrying the handle 4 in close engagement with the bead 1a. This permits the cover 2 to be made large enough to readily fit the rim 1a so that it may be easily removed and replaced.

It will be noted that after the handle 4 is initially raised to release the latch 6 from the bead 1a, the cover 2 may be swung about an axis disposed adjacent the diametrical opposite of the receptacle 1. From this it will be apparent that the connection for the cover at that side thereof opposite the handle 4 may be in the form of a typical hinge instead of a detachable connection or one that is effected by engagement or disengagement such as herein shown.

To those skilled in the art to which my invention relates, many changes in construction and widely differing embodiments and applications of the invention will suggest themselves without departing from the spirit and scope of the invention. My disclosures and the description herein are purely illustrative and are not intended to be in any sense limiting.

What I claim is:

1. A container construction comprising a receptacle having a projection, a cover for said receptacle having a depending rim formed with an opening, a linkage for controlling the locking and releasing of said cover, said linkage comprising two pivotally connected members, the upper member being connected to the top of said cover and serving as a handle and the lower member being pivotally mounted at its lower end on said rim in operative relation to said opening and swingable inwardly away from said rim to position its upper end within and below said projection.

2. A container construction comprising a receptacle having a projection, a cover for said receptacle having a depending rim formed with an opening, a linkage for controlling the locking and releasing of said cover, said linkage comprising an upper member and a lower member pivotally connected between its upper and lower ends to the outer end of said upper member, the upper member being connected to the top of said cover and serving as a handle and the lower member being pivotally mounted at its lower end on said rim in operative relation to said opening and swingable inwardly away from said rim to position its upper end within and below said projection.

3. A container construction comprising a receptacle having a projection, a cover for said receptacle having a depending rim formed with an opening, a linkage for controlling the locking and releasing of said cover, said linkage comprising an upper member and a lower member pivotally and slidably connected between its upper and lower ends to the outer end of said upper member, the upper member being connected to the top of said cover and serving as a handle and the lower member being pivotally mounted at its lower end on said rim in operative relation to said opening and swingable inwardly away from said rim to position its upper end within and below said projection.

4. A container construction comprising a receptacle having a projection, a cover for said receptacle having a depending rim formed with an opening, a linkage for controlling the locking and releasing of said cover, said linkage comprising an upper member and a lower member pivotally connected between its upper and lower ends to the outer end of said upper member, the upper member being mounted on the top of said cover and serving as a handle and the lower member being pivotally mounted at its lower end on said rim below said opening in operative relation thereto and swingable inwardly away from said rim to position its upper end within and below said projection.

5. A container construction comprising a receptacle having a circumferential projection, a cover for said receptacle having a depending rim formed with an opening, a pair of pivotally connected upper and lower links for controlling the locking and releasing of said cover, the outer end of the upper link being connected to the top of said cover to permit its inner end to swing upwardly and downwardly, the inner end of said upper link being operable through said opening, and the outer end of said lower link being pivotally mounted on said rim, the pivotal connection between said links being disposed intermediate the upper and lower ends of said lower link, whereby the upper end of the latter is operable to engage and disengage said projection.

6. In combination, a container having an outward projection at its upper portion, a cover for said container, a latch normally adapted, when the cover is in place on the container, to have a portion thereof underlying said projection, and means connected with the cover and movably connected with the latch and having a handle portion intermediate the points of connection with the cover and latch for lifting the cover from the container, said means being effective upon a lifting movement for moving said latch from under said projection.

7. In combination, a container having an outward projection at its upper portion, a cover for said container, a latch connected with said cover and so constructed and arranged as to be movable into latching position with its upper portion below said projection when said cover is in place on said container, a handle member, and means for interlockingly fastening said handle member to said latch, said handle member being effective upon operation for moving said latch out of latching position and raising said cover.

8. In combination, a container having an outward projection at its upper portion, a cover for said container, a latch connected with said cover and normally assuming a position, when the cover is in place on the container, in which a portion of the latch underlies said projection, and means loosely connected with the latch below said portion thereof which underlies said projection for moving the latch out of said position to permit removal of the cover.

9. In combination, a container having an outward projection at its upper portion, a cover for said container, a latch associated with said cover adjacent an opening therein and normally gravity actuated, when the cover is in place on the container, to a position in which a portion of the latch underlies said projection, and means associated with said latch and movable relatively thereto and, when the cover is in place on the container, extending through said opening, for moving said latch out of said position to permit removal of the cover.

EDGAR O. LOEBER.